United States Patent [19]
Pimley

[11] Patent Number: 5,952,802
[45] Date of Patent: Sep. 14, 1999

[54] METHOD OF CONTROLLING AN AUTOMOTIVE MIRROR

[75] Inventor: John Thomas Pimley, Noblesville, Ind.

[73] Assignee: Delco Electronics Corp., Kokomo, Ind.

[21] Appl. No.: 08/986,344

[22] Filed: Dec. 8, 1997

[51] Int. Cl.$^6$ .................................................. G05B 5/00
[52] U.S. Cl. .................. 318/468; 359/874; 359/876; 359/877; 248/487; 248/282
[58] Field of Search .................. 318/280–300, 318/466–470; 359/871–883; 248/476–487

[56] References Cited

U.S. PATENT DOCUMENTS

| | | | |
|---|---|---|---|
| 4,056,253 | 11/1977 | Repay et al. | 248/479 |
| 4,125,244 | 11/1978 | Lukey | 248/475.1 |
| 4,640,590 | 2/1987 | Wunsch | 359/877 |
| 4,727,302 | 2/1988 | Mizuta et al. | 318/567 |
| 4,798,967 | 1/1989 | Yamana et al. | 307/10.1 |
| 4,871,953 | 10/1989 | Anstee | 318/466 |
| 4,986,646 | 1/1991 | Hamamoto et al. | 359/873 |
| 5,008,603 | 4/1991 | Nakayama et al. | 318/568.1 |
| 5,019,759 | 5/1991 | Takemura et al. | 318/466 |
| 5,111,125 | 5/1992 | Barrs | 318/603 |
| 5,142,209 | 8/1992 | Barrs | 318/265 |
| 5,497,326 | 3/1996 | Berland et al. | 364/424.045 |
| 5,514,940 | 5/1996 | Okamoto | 318/469 |
| 5,530,327 | 6/1996 | Vecchiarino | 318/293 |
| 5,703,732 | 12/1997 | Boddy et al. | 359/841 |
| 5,790,328 | 8/1998 | Strauss et al. | 359/856 |
| 5,796,176 | 8/1998 | Kramer et al. | 318/466 |

*Primary Examiner*—David Martin
*Attorney, Agent, or Firm*—Jimmy L. Funke

[57] ABSTRACT

A mirror motor is coupled to the mirror by a ratchet coupling. A feedback signal representing the drive current of the mirror motor is digitally sampled and analyzed by a type of Fourier transform, preferably a discrete cosine transform, to determine the low frequency components of a current pulse which arises when the mirror reaches a stop at its end of travel and the ratchet operation begins to occur. A fundamental component is due to the pulse rise. Motor current is terminated if that component exceeds a threshold for a set time. A harmonic component is due to the ratchet action and pulse fall. Motor current is terminated if the harmonic element reaches another threshold.

5 Claims, 2 Drawing Sheets

METHOD OF CONTROLLING AN AUTOMOTIVE MIRROR

FIELD OF THE INVENTION

This invention relates to automotive mirror controls and particularly to a method of stopping a mirror drive motor at the end of mirror travel range.

Background of the Invention

Electrically driven automotive mirrors are typically driven by a motor through a ratchet coupling to allow the motor to continue operating even though the mirror reaches a stop at the limit of its range of travel. If the vehicle operator holds the switch closed when the mirror is at the stop the ratchet will slip continuously until the switch is released. This causes an annoying clicking and causes wear and tear on the mirror's mechanism. If a control switch is shorted, the clicking will continue until a switch shorted algorithm takes over and disables the mirror switch input; this typically requires about 20 seconds.

In a few vehicles with automatic mirror positioning for different drivers, the mirror is equipped with potentiometers to sense the mirror position. In that case detecting mirror limits and turning off the motor is simple, but such potentiometers are too expensive for general usage. It is desirable to avoid such expensive components and still have the ability to automatically turn off the motor at limits of its range.

When the mirror reaches a limit the resistance to movement causes an increase in motor current. However the current waveform is quite noisy due to commutator pulses which cannot be effectively filtered out. The magnitude of current when the mirror reaches the end of travel is not much more than the normal motion current due to the mirror ratcheting. Therefore just using current magnitude for mirror stall detection will not work reliably. The normal commutator pulses would keep any algorithm based on simple calculus derivatives from working effectively. FIG. 1 shows the current waveform for a prior art system lacking the current turn off feature: the several terminal pulses are those occurring due to ratcheting and usually have a frequency of about 1.2 Hz.

SUMMARY OF THE INVENTION

It is therefore an object of the invention to stop a mirror motor at the end of mirror travel without expensive hardware. Another object is to reliably detect motor current increase in spite of substantial noise.

A mirror control including a microprocessor controlled by a switch and a driver chip responsive to the microprocessor to provide motor current is equipped with a motor current detector to supply an analog voltage which mirrors the current. The motor drives the mirror through a slip coupling or ratchet which resists movement beyond the limit and clicks if the motor is not stopped upon meeting the resistance. An algorithm in the microprocessor analyzes the voltage waveform by a Fourier Transform to determine the magnitude of low frequency components which occur when the current rises upon reaching the ratchet resistance. The fundamental frequency component detects the rise of the pulse and motor current is terminated if the component value attains at least a threshold value for a set time. If the pulse rise is not detected and the motor continues to run, the first harmonic component of the fundamental frequency increases during the rapid current fall when the ratchet clicks. Upon reaching its threshold that value terminates the motor current.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

A mirror control uses one switch for mirror rotation about one axis and a second switch for rotation about an axis normal to the first axis. For simplicity, the following description refers to one switch, but it will be understood that the method applies to operation of each switch.

Figure 1:
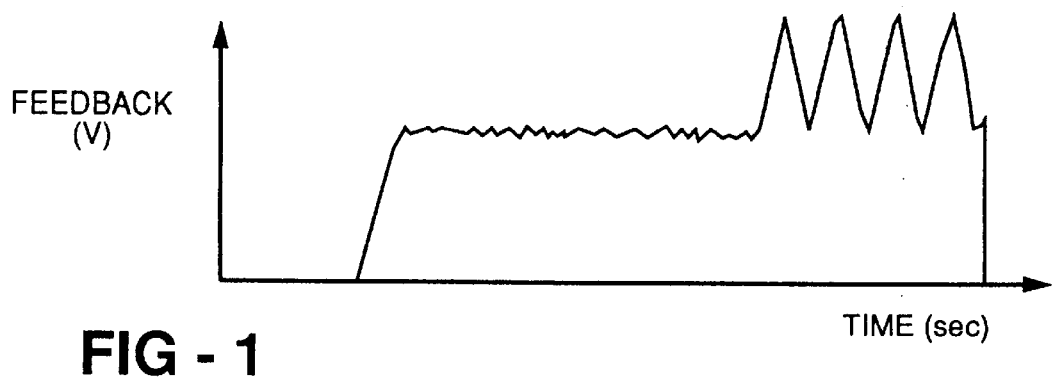
FIG. 1 is a waveform of motor current for a prior art mirror control.
Figure 2:
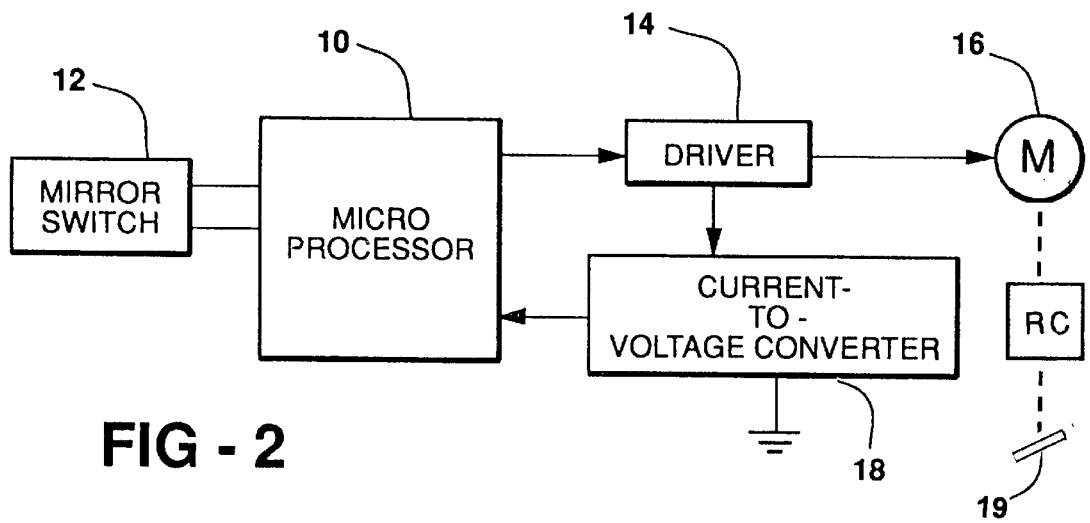
FIG. 2 is a block diagram of a mirror control system according to the invention.

FIG. 2 of the drawings shows a mirror control system including a microprocessor 10, a mirror switch 12 connected to the microprocessor, a mirror driver 14 controlled by the microprocessor, a mirror motor 16 driven by the driver 14, a ratchet coupling (RC) 17 coupled to the motor 16, and a mirror 19 coupled to the ratchet coupling 17. As thus far described, this is a conventional mirror control. However the system also includes a feedback circuit comprising a current to voltage converter 18 which produces an analog voltage representing the motor current which is fed back to the microprocessor.

Figure 3:
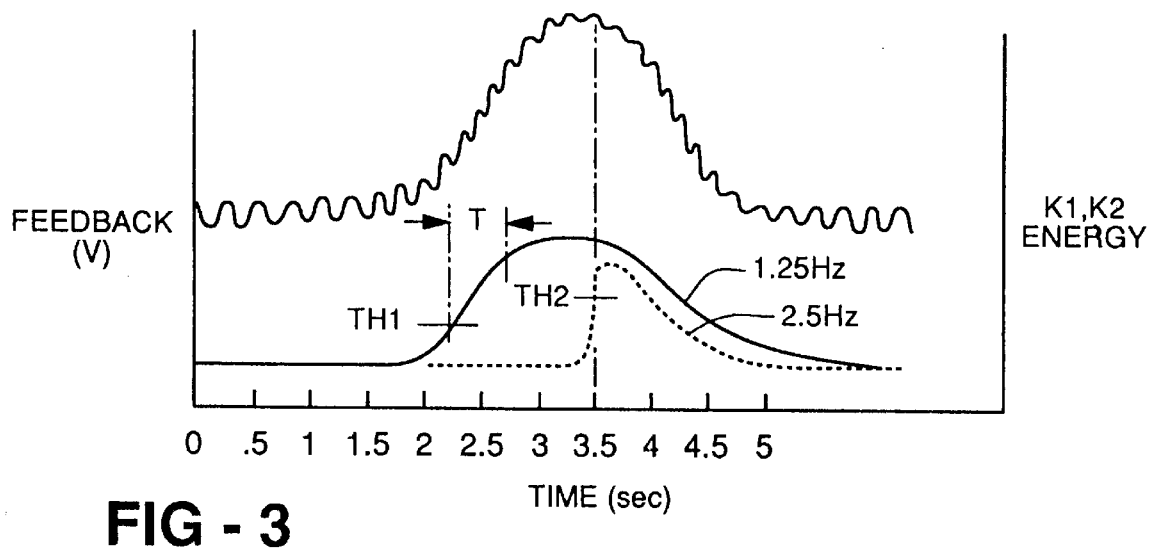
FIG. 3 is a waveform diagram of motor current during an end-of-travel pulse with curves representing fundamental frequency component and harmonic frequency component energy levels.

FIG. 3 illustrates one pulse of the feedback voltage which occurs when the mirror 19 reaches a limit and ratchets or clicks to permit motor operation for the condition where the motor current is not interrupted. The intent of the invention, however is to detect the pulse and stop the current either during the pulse rise, if it can be detected, or at least upon the ratchet or click event which is more easily detected.

The pulse can be analyzed into waveforms of different frequencies by applying some type of Fourier transform. In particular, it is preferred to use a discrete cosine transform (DCT) which is well known in the art of digital signal processing and is easy to calculate. The transform results in energy magnitudes at a fundamental frequency and several harmonic frequencies. FIG. 3 shows the energy curve for the fundamental frequency 1.24 Hz and the first harmonic 2.5 Hz. These curves are obtained by sampling the feedback voltage at 50 msec intervals and applying the DCT which will calculate the energy magnitudes at each interval for $k_0$ through $k_7$ elements of the transform. The element $k_0$ corresponds to DC or 0 Hz, $k_1$ represents 1.25 Hz, $k_2$ represents 2.5 Hz, and so on. While the complete DCT includes eight elements, only the fundamental $k_1$ and the first harmonic $k_2$ are required for the mirror control.

When the mirror 19 meets resistance at the end of travel the motor current rises and the curve for 1.25 Hz also rises. This rise is detected by comparing the value to a threshold TH1, and if the value remains above the threshold for a set time T the motor current will be terminated. In the ideal case the current stops before the ratchet action is completed and the associated click will not occur. In some cases, the $k_1$ curve will not trigger the current termination and the click will occur.

The $k_2$ curve representing the 2.5 Hz component rapidly rises when the click occurs due to falling current. This rise is easily detected by comparison with a threshold $TH_2$ and the motor current will be terminated. This $k_2$ detection could be used as the only detection criterion but it would always allow one click. By using both $k_1$ and $k_2$ criteria, the click will usually be avoided. The thresholds TH1 and TH2 and the set time T are empirically determined for each type of mirror application. Similarly the choice of 1.25 Hz for the fundamental DCT frequency is empirically determined, although it is expected that a value close to 1.25 Hz will be preferred for most mirror applications.

Figure 4:
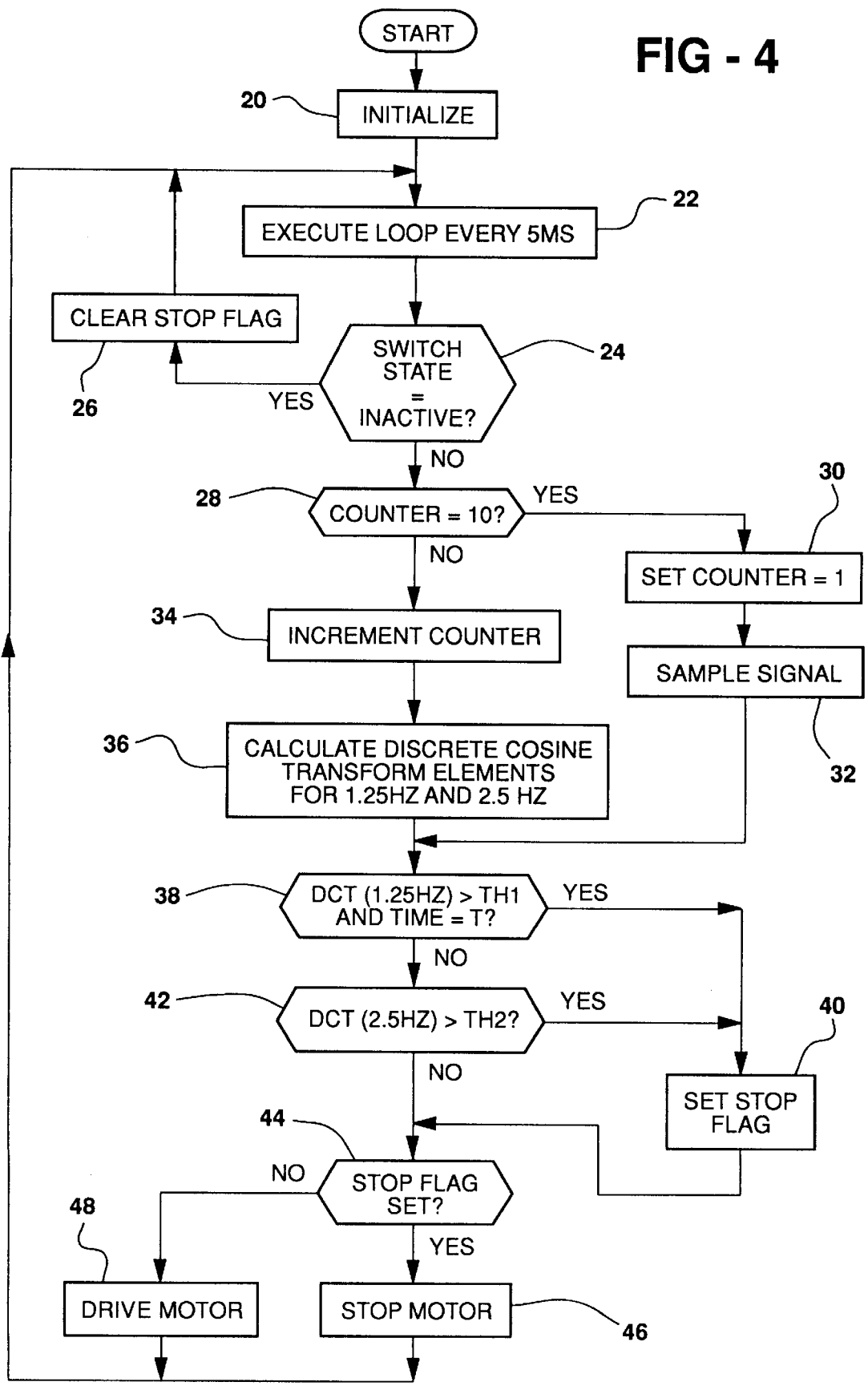
FIG. 4 is a block diagram representing an algorithm for detecting end-of-travel and stopping the motor current according to the invention.

The flow chart of FIG. 4 represents the algorithm used by the microprocessor 10 to stop the mirror motor 16 at the end of mirror travel. The functional description of each block in the chart is accompanied by a number in angle brackets <nn> which corresponds to the reference number of the block. When the program starts an initialization step [20] sets a stop flag to clear state and sets a counter to 1. The algorithm then is executed every 5 msec [22]. If the switch is inactive [24] the stop flag is cleared [26], but if not the counter is read. If the count reaches 10 [28] the counter is reset to 1 [30] and the feedback signal is sampled [32]. If the count is not 10 the counter is incremented [34] and then the DCT elements are calculated (one element in each loop) [36]. Thus the signal is sampled every 50 msec and the DCT elements are calculated in the sampling interval. Then the DCT element for 1.25 Hz is compared to the threshold TH1 and the time T is measured [38]. If the DCT element is above TH1 for a time T, the stop flag is set [40]. If not the harmonic element of the DCT is tested against TH2 and if it is greater than that threshold [42] the stop flag is set [40]. If the stop flag is set [44] the motor current is terminated [46] to stop the motor, but if the flag is not set the current is commanded to flow the drive the motor [48]. Then the loop repeats.

It will thus be seen that by the simple expedient of sensing motor current and analyzing it by an algorithm added to the existing microprocessor 10, the motor 16 of an electrically driven mirror 19 is made to stop at the end of mirror travel usually before a ratchet click occurs or otherwise as soon as one click occurs, thereby preventing a long series of annoying clicks if the switch is held closed or a short has occurred. This method has the ability to detect the rise or fall of pulses in the presence of high amplitude noise which is not easily filtered, and requires no expensive hardware such as mirror potentiometers.

The embodiments of the invention in which an exclusive property or privilege is claimed are defined as follows:

What is claimed is:

1. In an automotive mirror assembly including a motor for moving a mirror through a range bounded by limits in response to switch actuation and a ratchet coupling to permit the motor to continue operating when the mirror reaches a limit whereby current to the motor increases when a limit is reached and then decreases when a ratchet event occurs to thereby define a current pulse, a method of stopping current to the mirror when such a limit is reached comprising the steps of:

developing a feedback signal corresponding to motor current;

analyzing the feedback signal for a low frequency component wherein the amplitude of the low frequency component increases when the current pulse occurs; and stopping motor operation when the low frequency component exceeds a threshold value.

2. The method as defined in claim 1 wherein the step of analyzing the feedback signal comprises:

digitally sampling the feedback signal; and applying a Fourier transform to the digital samples to determine the magnitude of the low frequency component.

3. The method as defined in claim 2 wherein the step of applying a Fourier transform comprises applying a discrete cosine transform.

4. The method as defined in claim 1 wherein:

the ratchet operation causes signal pulsations at a given frequency if motor current were continued when the mirror reaches a limit; and the step of analyzing the feedback signal for a low frequency component comprises analyzing for a component near the given frequency.

5. The method as defined in claim 1 wherein:

the step of analyzing the feedback signal includes analyzing the feedback signal for a first low frequency component;

analyzing the feedback signal for a second component at a harmonic of the first low frequency; and the step of stopping motor operation includes stopping motor operation when the first component exceeds a threshold value which is sustained for a minimum period or when the second component exceeds a second threshold value.

* * * * *